US006864304B2

(12) United States Patent
Staniek

(10) Patent No.: US 6,864,304 B2
(45) Date of Patent: Mar. 8, 2005

(54) PHOSPHORUS COMPOUNDS

(75) Inventor: Peter Staniek, Binzen (DE)

(73) Assignee: Clariant Finance (BVI) Limited (VG)

(*) Notice: Subject to any disclaimer, the term of this patent is extended or adjusted under 35 U.S.C. 154(b) by 437 days.

(21) Appl. No.: 09/957,303

(22) Filed: Sep. 20, 2001

(65) Prior Publication Data

US 2002/0137820 A1 Sep. 26, 2002

Related U.S. Application Data

(63) Continuation of application No. 08/534,961, filed on Sep. 28, 1995, now Pat. No. 6,369,140, which is a continuation-in-part of application No. 08/324,430, filed on Oct. 17, 1994, now Pat. No. 5,488,079, which is a continuation of application No. 08/217,164, filed on Mar. 23, 1994, now abandoned.

(30) Foreign Application Priority Data

Mar. 25, 1993 (GB) .............................................. 9306186
Feb. 11, 1994 (GB) .............................................. 9402696

(51) Int. Cl.$^7$ ............................................... C08K 5/49
(52) U.S. Cl. ........................ 524/121; 524/116; 524/154
(58) Field of Search ................................. 524/121, 116, 524/154

(56) References Cited

U.S. PATENT DOCUMENTS

| | | | |
|---|---|---|---|
| 2,981,716 | A | 4/1961 | Street et al. |
| 3,069,246 | A | 12/1962 | Loper et al. |
| 3,242,216 | A | 3/1966 | Maier |
| 3,255,151 | A | 6/1966 | Beckler et al. |
| 3,257,460 | A | 6/1966 | Gordon et al. |
| 3,471,568 | A | 10/1969 | van Ghemen et al. |
| 3,637,907 | A | 1/1972 | Mathis et al. |
| 4,111,899 | A | 9/1978 | Baggett et al. |
| 4,198,310 | A | 4/1980 | Lyons et al. |
| 4,542,199 | A | 9/1985 | Kaminsky et al. |
| 4,752,597 | A | 6/1988 | Turner |
| 4,835,202 | A | 5/1989 | Pastor et al. |
| 4,937,299 | A | 6/1990 | Ewen et al. |
| 5,488,079 | A | 1/1996 | Staniek |
| 6,369,140 | B1 * | 4/2002 | Staniek ...................... 524/116 |

FOREIGN PATENT DOCUMENTS

| | | |
|---|---|---|
| EP | 0 078 244 | 5/1983 |
| FR | 1357937 | 3/1964 |
| FR | 1357937 | 12/1964 |
| GB | 830240 | 6/1960 |
| GB | 838042 | 6/1960 |
| GB | 975720 | 11/1964 |

OTHER PUBLICATIONS

English abstract for SU 1219610, Mar. 23, 1986.
English abstract for JP 62-167346, Jul. 23, 1987.
English abstract for JP 62-81454, Oct. 7, 1994.
Mulhaupt, "New Trends in Polyolefin Catalysts and Influence on Polymer Stability" International Conference on Advances in Stabilization and Controlled Degradation of Polymers, (1990) p. 189–196.

Shijing Xiao, et al., "Study on the NdC13–13 supported Ziegler–Natta catalyst for olegin polymerization", Makromol. Chem. 192, p. 1059–1065, (1991).
Robert D. Leaversuch, "Polyolefins gain higher performance from new catalyst technologies", Modern Plastics, Oct. 1991, p. 46–49.
Plastics Additive Handbook, "Stabilizers, Processing Aids, Plasticizers, Fillers, Reinforcements, Colorants for Thermoplastics", 3$^{rd}$ Edition, 1990, p. 42–49.

* cited by examiner

Primary Examiner—Edward J. Cain
(74) Attorney, Agent, or Firm—Anthony A. Bisulca

(57) ABSTRACT

A polyolefinic composition comprising as component a) one or more compounds of formula I to III

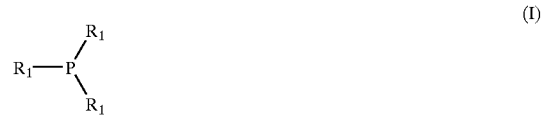

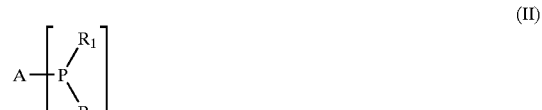

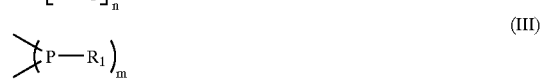

in which
each $R_1$ independently is selected from linear or branched $C_{1-30}$alkyl, $C_{5-12}$cycloalkyl, $C_{2-24}$alkenyl, $C_{2-18}$alkoxyalkyl, $C_{2-19}$methoxyalkanoyl, $C_{7-30}$alkaryl, $C_{7-30}$aralkyl, $C_{4-24}$heteroaryl (where any one of the above substituents of $R_1$ are unsubstituted or are substituted by 1 to 3 groups selected from $C_{1-12}$alkyl, —$OR_4$, —$NR_4R_5$, —$COR_4$ and —$COOR_4$); and $C_{6-30}$aryl, unsubstituted or substituted by 1 to 5 groups $R_3$ selected from $C_{1-12}$alkyl, $C_{1-8}$alkoxy, $C_{5-6}$cycloalkyl, phenyl or phenoxy, —$OR_4$, —$NR_4R_5$, —$COR_4$ and —$COOR_4$,
$R_4$ and $R_5$ independently are selected from hydrogen, $C_{1-30}$alkyl (linear or branched), $C_{5-12}$cycloalkyl, $C_{6-24}$aryl, $C_{7-30}$alkaryl or $C_{7-30}$aralkyl;
A is a direct bond, a group —(P—$R_1)_p$— or an n-valent aliphatic or aromatic residue, (preferably $C_{1-30}$alkylene (linear or branched), $C_{5-12}$cycloalkylene, $C_{7-30}$alkarylene, $C_{7-30}$ aralkylene, $C_{6-24}$arylene, a N-, O-, S-, or P-containing $C_{6-24}$heteroarylene, $C_{2-30}$alkylidene or $C_{2-30}$alkylene interrupted by N, O or S); provided that when n is 2 then A is —$CH_2$— or $C_{5-30}$alkylene;
m is 3 to 12; preferably 4–6
n is 2 to 5; and
p is 1 to 12; preferably 1–5
the compounds of formulae I to III, and
component b) a polyolefin which has been produced in the presence of a Ziegler or metallocene type catalyst which has not been removed.

14 Claims, No Drawings

PHOSPHORUS COMPOUNDS

This is a continuation of U.S. Ser. No. 08/534,961, filed Sep. 28, 1995, now U.S. Pat. No. 6,369,140, which is a continuation-in-part of U.S. Ser. No. 08/324,430, filed Oct. 17, 1994, now U.S. Pat. No. 5,488,079, which is a continuation of U.S. Ser. No. 08/217,164, filed Mar. 23, 1994, abandoned. U.S. Ser. No. 08/324,430 is incorporated herein by reference.

This invention relates to the use of certain phosphorus-containing compounds that can act at low concentrations as stabilizers for polyolefins against degradation caused by heat, mechanical stress or light. They are especially suitable for polyolefins which have been made with a II and higher generation catalyst (e.g. II to V generation catalysts).

According to the invention, there is provided a polyolefinic composition comprising:

a) a compound of formula I to III

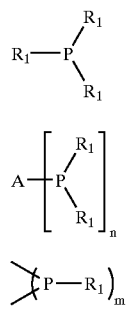

in which each $R_1$ independently is selected from linear or branched $C_{1-30}$alkyl, $C_{5-12}$cycloalkyl, $C_{2-24}$alkenyl, $C_{2-18}$alkoxyalkyl, $C_{2-19}$alkanoylmethylene, $C_{7-30}$alkaryl, $C_{7-30}$aralkyl, $C_{4-24}$ heteroaryl where any one of the above substituents of $R_1$ are unsubstituted or are substituted by 1 to 3 groups selected from $C_{1-12}$alkyl, —$OR_4$, —$NR_4R_5$, —$COR_4$ and —$COOR_4$); and $C_{5-30}$aryl, unsubstituted or substituted by 1 to 5 groups $R_3$ selected from $C_{1-12}$alkyl, $C_{1-8}$alkoxy, $C_{5-6}$cycloalkyl, phenyl or phenoxy, —$OR_4$, —$NR_4R_5$, —$COR_4$ and —$COOR_4$, $R_4$ and $R_5$ independently are selected from hydrogen, $C_{1-30}$alkyl (linear or branched), $C_{5-12}$cycloalkyl, $C_{6-24}$aryl, $C_{7-30}$alkaryl or $C_{7-30}$aralkyl;

A is a direct bond, a group —$(P-R_1)_p$— or an n-valent aliphatic or aromatic residue, preferably $C_{1-30}$alkylene (linear or branched), $C_{5-12}$cycloalkylene, $C_{7-30}$alkarylene, $C_{7-30}$ aralkylene, $C_{6-24}$arylene, a N-, O-, S-, or P- containing $C_{6-24}$heteroarylene, $C_{2-30}$alkylidene or $C_{2-30}$alkylene interrupted by N, O or S;

m is 3 to 12 preferably 4–6;

n is 2 to 5; and p is 1 to 12; preferably 1–5;

(the compounds of formulae I to III hereinafter being called "component a"); and b) a polyolefin which has been produced in the presence of a Ziegler or metallocene type catalyst which has not been removed (hereinafter called "component b").

For the avoidance of doubt, compounds of formula III are cyclic compounds.

In the compounds of Formula I, when n is 2 and A is $C_{1-3}$alkylene, A in such a case is preferably —$CH_2$— or $C_{5-30}$alkylene.

Preferred compounds of formula I are of formula Ia

in which each $R_1'$ independently is selected from $C_{8-18}$alkyl, $C_{6-18}$aryl, $C_{4-12}$heteroaryl, $C_{2-18}$ alkoxyalkyl, $C_{7-30}$alkaryl, $C_{7-30}$aralkyl, $C_{2-19}$alkanoylmethylene, or a group of formula γ

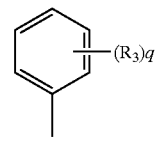

in which each $R_3$ is independently selected from $C_{1-8}$alkyl, $C_{1-8}$alkoxy, $C_{5-6}$cycloalkyl, phenyl or phenoxy; and q is 1 to 5; preferably from 1 to 3.

Preferred compounds of formula II are of formula IIa

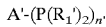

in which each $R_1'$ independently is selected from $C_{8-18}$alkyl, $C_{6-18}$aryl, $C_{4-12}$heteroaryl, $C_{2-18}$alkoxyalkyl, $C_{7-30}$alkaryl, $C_{7-30}$aralkyl, $C_{2-19}$alkanoylmethylene or a group of formula γ

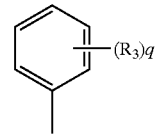

in which each $R_3$ is independently selected from $C_{1-8}$alkyl, $C_{1-8}$alkoxy, $C_{5-6}$cycloalkyl, phenyl or phenoxy; and q is 1 to 5; preferably from 1 to 3; and A' is selected from $C_{1-12}$alkylene, $C_{1-12}$alkylidene, $C_{6-18}$arylene, $C_{4-12}$heteroarylene, $C_{5-12}$alkylene, $C_{12-18}$ cycloalkylene, phenoxyphenylene, $C_{3-18}$alkylamino$C_{1-12}$alkylene; and n' is 2 to 4.

Preferred compounds of formula III are of formula IIIa

in which each $R_2'$ independently is $C_{1-12}$alkyl, cyclohexyl, methyl or $C_{6-12}$aryl; and m' is 4 or 5.

More preferred compounds of formula I are of formula Ib

in which each $R_1''$ independently is selected from $C_{10-18}$alkyl, $C_{6-12}$aryl, $C_{4-10}$heteroaryl, $C_{3-18}$alkoxyalkyl, $C_{2-19}$alkanoylmethylene, $C_{7-24}$alkaryl, $C_{7-24}$aralkyl, or a group of formula γ

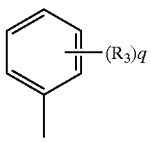  (γ)

in which each $R_3$ is independently selected from $C_{1-8}$alkyl, $C_{1-8}$alkoxy, $C_{5-6}$cycloalkyl, phenyl or phenoxy; and
q is 1 to 5; preferably from 1 to 3.

More preferred compounds of formula II are of formula IIb

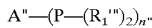 A''—(P—($R_1'''$)$_2$)$_{n''}$  IIb in which each $R_1'''$ independently is selected from $C_{10-18}$alkyl, $C_{4-9}$heteroaryl, $C_{7-24}$alkaryl, $C_{4-18}$ alkoxyalkyl or of formula γ

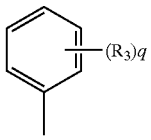  (γ)

in which each $R_3$ is independently selected from $C_{1-8}$alkyl, $C_{1-8}$alkoxy, $C_{5-6}$cycloalkyl, phenyl or phenoxy; and
q is 1 to 5; preferably from 1 to 3;
A'' is selected from $C_{2-12}$alkylene, $C_{2-12}$alkylidene, $C_{6-12}$arylene, $C_{2-12}$alkoxyalkylene, phenoxyphenylene, $C_{4-10}$heteroarylene, $C_{6-8}$ cycloalkylene, $C_{3-12}$alkylaminoalkylene; and
n'' is 2 to 4.

Most preferred are of formula I are of formula Ic ($R_1'''$)$_3$P  (Ic)

in which each $R_1'''$ independently is selected from $C_{10-18}$alkyl, $C_{4-9}$heteroaryl, $C_{7-24}$alkaryl, $C_{4-15}$ alkoxyalkyl or of formula γ

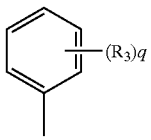  (γ)

in which each $R_3$ is independently selected from $C_{1-8}$alkyl, $C_{1-8}$alkoxy, $C_{5-6}$cycloalkyl, phenyl or phenoxy; and
q is 1 to 5; preferably from 1 to 3.

Most preferred compounds of formula II are of formula IIc

A'''—(P—($R_1'''$)$_2$)$_{n'''}$  (IIc)

in which $R_1'''$ is as defined above;

A''' is selected from $C_{5-12}$alkylene, $C_{6-12}$arylene, $C_{4-12}$alkoxyalkylene, phenoxyphenylene, $C_{4-9}$heteroarylene, cyclohexylene, cyclooctylene, $C_{3-8}$alkyl-aminoalkylene; and
n''' is 2 or 3.

The compounds of formulae I to III may be made from known compounds by known methods. Reviews of such reaction procedures are given in e.g. G. M. Kosolapoff, Organic Phosphorus Compounds, Vol. 1–7, Wiley, New York, 1972 or Houben/Veyl, Methoden.der Organischen Chemie, Vol. 12, 4. Auflage, Georg Thieme Verlag, Stuttgart 1963 and corresponding supplementary volumes. The contents of which are incorporated herein by reference.

Compounds of Formula II wherein A is a direct bond and compounds of Formula III are also prepared by a process which comprises reacting either a secondary phosphine of the formula $R_1R_1PH$ or a primary phosphine of the formula $R_1PH_2$ with a halogen, preferably chlorine or bromine, in the presence of an acid acceptor, for example, an oxide, hydroxide, or carbonate of an alkali or alkaline earth metal or an amine, preferably a tertiary amine, optionally in the presence of an inert solvent. Secondary phosphines result in compounds of Formula II wherein A is a direct bond. Primary phosphines result in compounds of Formula III. Advantageously, this process uses as starting materials alkyl phosphines which are more readily available than the halophosphines that are used in the art.

Typically those compounds are prepared from organohalides such as alkyl- or aryl chlorides or alkyl or arylbromides and $PCl_3$ via a Grignard or modified Wurtz reaction; via Friedel-Crafts reaction; by addition of P—H containing compound to multiple bonds; by Arbuzov reaction of diorganophosphinites with organohalides and subsequent reductions; or by derivation from already formed phosphines.

Compounds of formula I to III of special interest are selected from:

Tris-octyl-phosphine
Tris-decyl-phosphine
Tris-dodecyl-phosphine
Tris-tetradecyl-phosphine
Tris-hexadecyl-phosphine
Tris-octadecyl-phosphine
Tris-benzyl-phosphine
Phenyl-dibenzyl-phosphine
Diphenyl-benzyl-phosphine
Tris(1-phenylethyl)phosphine
Phenyl-di(1-phenylethyl)phosphine
Diphenyl-(1-phenylethyl)phosphine
Tris(2-phenylethyl)phosphine
Phenyl-di(2-phenylethyl)phosphine
Diphenyl(2-phenylethyl)phosphine
Tris(2-phenyl-2-methylethyl)phosphine
Phenyl-di(2-phenyl-2-methylethyl)phosphine
Diphenyl(2-phenyl-2-methylethyl)phosphine
Tris(2-methyl-phenyl)phosphine
Tris(4-methyl-phenyl)phosphine
Tris(2-ethyl-phenyl)phosphine
Tris(4-methyl-phenyl)phosphine
Tris(2-tert-butyl-phenyl)phosphine Tris(4-tert-butyl-phenyl)phosphine
Tris(2-butyl-phenyl)phosphine
Tris(4-butyl-phenyl)phosphine
Tris(2-octyl-phenyl)phosphine
Tris(4-octyl-phenyl)phosphine
Tris(2,4-dimethyl-phenyl)phosphine
Tris(2,6-dimethyl-phenyl)phosphine
Tris(2,4-diethyl-phenyl)phosphine
Tris(2,6-diethyl-phenyl)phosphine
Tris(2,4,6-timethyl-phenyl)phosphine
Tris(2,4,6-tiethyl-phenyl)phosphine
Tris(2,4-di-tert-butyl-phenyl)phosphine
Tris(2,6-di-tert-butyl-phenyl)phosphine
Tris(2,4-dibutyl-phenyl)phosphine
Tris(2,6-dibutyl-phenyl)phosphine
Tris(2,4,6-tri-tert-butyl-phenyl)phosphine
Tris(2,4,6-tributyl-phenyl)phosphine
Tris(2,4-dioctyl-phenyl)phosphine
Tris(2,6-dioctyl-phenyl)phosphine
Tris(2,4,6-trioctyl-phenyl)phosphine
Diphenyl-octyl-phosphine
Diphenyl-decyl-phosphine
Diphenyl-dodecyl-phosphine
Diphenyl-tetradecyl-phosphine
Diphenyl-hexadecyl-phosphine
Diphenyl-octadecyl-phosphine
Phenyl-di-octyl-phosphine
Phenyl-di-decyl-phosphine
Phenyl-di-dodecyl-phosphine
Phenyl-ditetradecyl-phosphine
Phenyl-di-hexadecyl-phosphine
Phenyl-di-octadecyl-phosphine
Tris(2-methoxy-phenyl)phosphine
Tris(4-methoxy-phenyl)phosphine
Tris(2-butoxy-phenyl)phosphine
Tris(4-butoxy-phenyl)phosphine
Tris(2-octoxy-phenyl)phosphine
Tris(4-octoxy-phenyl)phosphine
Tris(2-phenoxy-phenyl)phosphine
Tris(4-phenoxy-phenyl)phosphine
Tris(2,4-dimethoxy-phenyl)phosphine
Tris(2,6-dimethoxy-phenyl)phosphine
Tris(2,4,6-trimethoxy-phenyl)phosphine
Tris(2,4-dibutoxy-phenyl)phosphine
Tris(2,6-dibutoxy-phenyl)phosphine
Tris(2,4,6-tributoxy-phenyl)phosphine
Tris(2,4-dioctoxy-phenyl)phosphine
Tris(2,6-dioctoxy-phenyl)phosphine
Tris(2,4,6-trioctoxy-phenyl)phosphine
Tris(2,4-diphenoxy-phenyl)phosphine
Tris(2,6-diphenoxy-phenyl)phosphine
Tris(2,4,6-triphenoxy-phenyl)phosphine
Tris-1-naphthylphosphine
Tris-2-naphthylphosphine
Tris-2-biphenylylphosphine
Tris-3-biphenylylphosphine
Tris-4-biphenylylphosphine
Tetraphenyl-ethylene-diphosphine
Tetraphenyl-propylene-diphosphine
Tetraphenyl-butylene-diphosphine
Tetraphenyl-hexylene-diphosphine
Tetraphenyl-octylene-diphosphine
Tetraphenyl-c-hexylene-diphosphine
Tetraphenyl-c-octylene-diphosphine
Tetraphenyl-phenylene-diphosphine
Tetraphenyl-biphenylene-diphosphine
Tetraphenyl-phenoxyphenylene-diphosphine
Hexaphenyl-triphenyleneamino-triphosphine
2,4,6-tris-diphenylphosphino-s-triazine
Tris-2-pyridinylphosphine
Tris-2-quinolinylphosphine
Hexaphenyl-3-tripropyleneamino-trisphosphine
Hexaphenyl-2-tripropyleneamino-triphosphine and
Tris(octadecenoyl-methylene)phosphine The compounds of formula III are cyclic compounds in which the P atoms form the ring with a pendant $R_1$ group.

Preferably component a) is present in an amount of 0.005–5%, more preferably 0.02–1% based on the weight of the polymer present in the composition.

The term metallocene is used to describe new catalysts of generation V and higher which are used to produce polyolefins (especially polyethylenes and polypropylenes) as described for example in "Modern Plastics" 10/91 p. 46–49 and in "Makromolekulare Chemie", 192, 1059 (1991). The supported Ziegler catalysts (such as those supported on a halogen containing magnesium compound) are well known and are described in Table 1 below.

Further additives which may be added to a polymeric composition according to the invention include antioxidants, such as sterically hindered phenols, secondary aromatic amines or thioethers, (as described in "Kunststoff-Additive"-Gächter/Müller, Ed. 3, 1990 p. 42–50, the contents of which are incorporated herein by reference); acid scavengers such as sodium, magnesium and calcium stearates and lactates, zinc oxide hydrotalcite or alkoxylated amines; U.V. stabilizers such as other sterically hindered amines (for example N-unsubstituted, N-alkyl or N-acyl substituted 2,2,6,6-tetra-methylpiperidine compounds) [also known as hindered amine light stabilizers—HALS] and U.V. absorbers (e.g. 2-(2'-hydroxyphenyl)-benztriazoles, 2-hydroxybenzophenones, 1,3-bis-(2'-hydroxy-benzoyl) benzene salicylates, cinnamates and oxalic acid diamides), U.V. quenchers such as benzoates and substituted benzoates, antistatic agents, flameproofing agents, lubricants, plasticisers, nucleating agents, metal deactivators, biocides, impact modifiers, fillers, pigments and fungicides.

Component a) may be added to the polymeric material before, during or after the polymerization step and may be added in solid or molten form, in solution preferably as a liquid concentrate containing from 10 to 80% by weight of the composition and 90 to 20% by weight of solvent or as a solid masterbatch composition containing 10 to 80% (more preferably 40 to 70%) by weight of the composition and 90 to 20% (more preferably 60 to 30%) by weight of a solid polymeric material which is identical with or compatible with the material to be stabilized.

Component a) may be incorporated by known methods into the polymeric material to be stabilized. Of particular importance is dry-blending of component a) with the polymer or coating shaped polymer particles, e.g. polymer spheres, or in the form of a liquid, a solution or a suspension/dispersion. Of particular importance is blending of the compounds with thermoplastic polymers in the melt, for example in a melt blender or during the formation of shaped articles, including films, tubes, fibres and foams by extrusion, injection moulding, blow moulding, spinning or wire coating. Component a) is particularly useful for stabilizing polypropylene and polyethylene articles of every type as well as polycarbonate, polystyrene and polyurethane.

Component a) is especially suitable for use in polyolefins and especially α-polyolefins prepared using processing catalysts known as Generation II to Generation V catalysts and which have not been subjected to a catalyst removal step. By the term "catalyst removal step" used herein is meant a step for the purpose of positively removing the catalyst residues contained in the polymerized polyolefins or treating the polyolefins with the compound which can react with the catalyst residue and inactivate or solubilize the residue, such as alcohols or water, and then removing the inactivated or solubilized catalyst residue by physical means such as filtration, washing and centrifuging. Thus, in the case of suspension polymerization, the step of separating the resulting polymer from a dispersion medium, such as a solvent or a liquefied monomer, does not fall under the abovementioned definition of the catalyst residue removal step, although the catalyst dissolved in the dispersion medium may be removed by a separation step. The step of adding a small amount of catalyst poisons such as ethers, alcohols, ketones, esters and water to the resulting polymer, to inactivate the catalyst remaining after the completion of polymerization, or the step of treating the resulting polymer suspension with gas such as steam or nitrogen to remove the dispersion medium also does not fall under the abovementioned definition of the "catalyst residue-removal" step.

What is meant by Generation I catalysts is titanium halide catalysts and an organo aluminium compound or an organo aluminium halide.

What is meant by Generation II catalysts is Generation I catalysts supported on an organo magnesium compound or based on an organo chromium compound supported on $SiO_2$.

What is meant by a Generation III catalyst is a Ziegler type complex catalyst supported on a halogen containing magnesium compound.

What is meant by a Generation IV catalyst is a Generation III catalyst with a silane donor.

What is meant by Generation V catalysts is a bis-indenyl organo titanium compound supported on alumoxane or bis cyclopentadienyl titanium halides activated by aluminium alkyl compound.

Further generations of highly specific catalysts, especially useful for manufacturing highly stereoregular poly-α-olefins, which are presently under development, are included in the concept of II and higher Generation catalysts, as well as the abovementioned generations of supported catalyst systems.

Examples for the microstructure of such highly stereoregular polyolefins are given by syndiotactic polypropylene, isotactic stereoblock polymers, isotactic polypropylene containing stearic defects randomLy distributed along the polymer chain (so called anisotactic polypropylene) or stereoirregular stereoblock polymers. Due to the rapid progress in the development of newer generation catalyst systems, the commercial significance of these polymers with novel, highly interesting properties is increasing. However, residues of such further catalyst generations, as long as they contain metals of the 3d, 4d and 5d series of the periodic system supported analogously to the earlier catalyst generations, can also cause disadvantageous properties in the polymer, as long as such residues are still present in the polymer even if in a deactivated form. In view to this, it can therefore be expected that component a) according to the invention is also suitable for overcoming such disadvantageous properties of the polymer. This means that any disadvantageous interaction between processing stabilizers and the aforementioned residues of catalysts of further generations, particularly the hydrolysis of phosphites and phosphonites, is most effectively inhibited.

These generations of catalysts are described in the publication of the Twelfth Annual International Conference on Advances in the stabilization and Controlled Degradation of Polymers held in Luzern, Switzerland, May 21–23, 1990 in an article on pages 181 to 196 inclusive by Rolf Mülhaupt entitled "New Trends in Polyolefin Catalysts and Influence on Polymer Stability". The contents of this article is incorporated herein by reference and especially Table I on page 184 describing the Generation of Catalysts:

TABLE I

Polyolefin Catalyst Evolution

| Generation Example | | Cat.Act. (g PP/g Ti h atm) | % Act.Ti | Stereoreg. (% insol in heptane) | Process Technology |
|---|---|---|---|---|---|
| I. | $TiCl_4/AlR_3$ | 40 | 0.01 | 45% | removal of cat.residues and atactic PP |
| | $TiCl_3/AlEt_2Cl$ | 30 | 0.1 | 92% | removal of catalyst residues |
| II | $Mg(OEt_2)/$ $TiCl_4/AlR_3$ | 40000 | — | 50% | no removal of cat.residues |
| | $SiO_2/Cp_2Cr$ | 40000 | HDPE | | (mainly HDPE/ LLDPE) |
| III | $Mod.TiCl_3cat.$ | 5000 | 1 | 95% | no purification |
| | $MgCl_2/TiCl_4/$ $AlR_3$ + ester donor | 20000 | 10 | 92% | |
| IV | $MgCl_2/TiCl_4/$ $AlR_3$ + silane donor | 40000 | 18 | 99% | no purification no extrusion |
| V | Bis-indenyl-$TiR_2$ on $(AlCH_3O)_x$ | 40000 | 100 | 99% | novel PPs, narrow MWD | in which R, in Table 1, is an organo group; HDPE is high density polyethylene, LLDPE is linear low density polyethyene, Cp is cyclopentadienyl, Et is ethyl, PP is polypropylene and MWD is molecular weight distribution.

Further, in this specification, where a range is given, the figures defining the range are included therein. Any group capable of being linear or branched is linear or branched unless indicated to the contrary.

For the avoidance of doubt, in this specification t-butyl means tertiary butyl, $(—C(CH_3)_3)$.

The invention will now be illustrated by the following Examples.

EXAMPLE 1

Synthesis of tris(4-methyl-phenyl)phosphine

Under inert conditions a solution of 0.1 mol $PCl_3$ in 150 mL heptane is dropped, while cooling, into a stirred solution of 0.3 mols 4-methyl-phenyl-magnesium bromide prepared from 0.3 mol 4-methyl-bromobenzene and 0.31 mol magnesium turnings, in 100 mL THF. After completing the addition the mixture is refluxed for 1 hour, cooled to room temperature and 100 mL water are added carefully. The organic phase is washed with water and dried over $Na_2SO_4$. The colorless product crystallizes after evaporation of the solvent and is recrystallized from heptane. Yield 58%, mp.: 147–149° C.

THF is tetrahydrofurane.

EXAMPLES 2–5

According to the method of example 1, the following substances can be prepared from appropriate reactants

| Substance | | Yield | mp. |
|---|---|---|---|
| Example 2 | Tris(2-methyl-phenyl)phosphine | 40% | 126° C. |
| Example 3 | Tris(4-methoxy-phenyl)phosphine | 23% | 129° C. |
| Example 4 | Tris(2-methoxy-phenyl)phosphine | 54% | 209° C. |
| Example 5 | Tris(1-naphthyl)phosphine | 53% | 263° C. |

EXAMPLE 6

A polymeric composition containing

| | |
|---|---|
| 100.0 parts | 3rd generation polypropylene homopolymer |
| 0.05 part | of tetrakis(methylene-3,(3',5'-di-tert.butyl-4'-hydroxy-phenyl)propionate) methane commercially available as Irganox 1010 ( a trademark); |
| 0.1 part | calcium stearate; |
| 0.04 part | of tris(4-methyl-phenyl)phosphine (prepared in Example 1) | are mixed by dry blending and pre-extruding at 210° C. This composition is then multiply extruded in a Göttfert single screw Extruder (270° C., d-20 mm, l:d=20, 50 min-1 compression 1:3) and is pelletized after chilling the polymer melt in a water bath. The melt flow index (ASTM D-1238-70, 230° C., 2.16 kg) and the yellowness index (ASTM D-1925-70, on pellets) are determined after the first, third and fifth passage.

EXAMPLE 7

A polymeric composition is prepared according to the method of Example 6, except that 0.07 parts of tris(4-methyl-phenyl)phosphine is used instead of 0.04 parts.

EXAMPLE 8

A polymeric composition is prepared according to the method of Example 6, except that 0.04 parts of tris(2-methyl-phenyl)phosphine is used instead of 0.04 parts tris(4-methyl-phenyl)phosphine.

EXAMPLE 9

A polymeric composition is prepared according to the method of Example 6, except that 0.07 parts of tris(2-methyl-phenyl)phosphine is used instead of 0.04 parts tris(4-methyl-phenyl)phosphine.

EXAMPLE 10

A polymeric composition is prepared according to the method of Example 6, except that 0.04 parts of tris(4-methoxy-phenyl)phosphine is used instead of 0.04 parts tris(4-methyl-phenyl)phosphine.

EXAMPLE 11

A polymeric composition is prepared according to the method of Example 6, except that 0.07 parts of tris(4-methoxy-phenyl)phosphine is used instead of 0.04 parts tris(4-methyl-phenyl)phosphine.

EXAMPLE 12

A polymeric composition is prepared according to the method of Example 6, except that 0.04 parts of tris(2-methoxy-phenyl)phosphine is used instead of 0.04 parts tris(4-methyl-phenyl)phosphine.

EXAMPLE 13

A polymeric composition is prepared according to the method of Example 6, except that 0.07 parts of tris(2-methoxy-phenyl)phosphine is used instead of 0.04 parts tris(4-methyl-phenyl)phosphine.

EXAMPLE 14

A polymeric composition is prepared according to the method of Example 6, except that 0.04 parts of tris(1-naphthyl)phosphine is used instead of 0.04 parts tris(4-methyl-phenyl)phosphine.

EXAMPLE 15

A polymeric composition is prepared according to the method of Example 6, except that 0.07 parts of tris(1-naphthyl)phosphine is used instead of 0.04 parts tris(4-methyl-phenyl)phosphine.

COMPARATIVE EXAMPLE A

A polymeric composition is prepared according to the method of Example 6, except that 0.04 parts of tris(2,4-di-tert-butyl-phenyl)phosphite is used instead of 0.04 parts of tris(4-methyl-phenyl)phosphine.

COMPARATIVE EXAMPLE B

A polymeric composition is prepared according to the method of Example 6, except that 0.07 parts of tris(2,4-di-tert-butyl-phenyl)phosphite is used instead of 0.04 parts of tris(4-methyl-phenyl)phosphine.

COMPARATIVE EXAMPLE C

A polymeric composition is prepared according to the method of Example 6, except that no phosphorus-containing additive is used.

The results of Examples 6–15 and the Comparative Examples can be seen in the Table below:

| Example No. Extruder | MFI | | | YI | | |
|---|---|---|---|---|---|---|
| Pass: | 1 | 3 | 5 | 1 | 3 | 5 |
| 6 | 2.77 | 3.36 | 4.50 | 0.3 | 1.9 | 3.7 |
| 7 | 2.87 | 3.66 | 4.52 | 0.1 | 2.3 | 3.9 |
| 8 | 2.99 | 3.94 | 4.97 | −0.3 | 2.1 | 3.4 |
| 9 | 2.75 | 3.56 | 4.61 | 0.1 | 2.2 | 3.5 |
| 10 | 3.22 | 4.06 | 5.02 | −0.1 | 2.0 | 4.7 |
| 11 | 2.82 | 3.47 | 3.97 | −0.7 | 1.2 | 3.3 |
| 12 | 2.88 | 3.83 | 4.99 | 0.2 | 2.3 | 5.5 |
| 13 | 2.69 | 3.27 | 3.95 | 0.2 | 2.4 | 4.6 |
| 14 | 2.54 | 3.08 | 3.96 | −0.5 | 0.9 | 2.3 |
| 15 | 2.89 | 3.68 | 4.71 | 1.7 | 3.8 | 5.4 |
| A | 4.30 | 5.26 | 7.43 | 2.5 | 3.9 | 6.2 |
| B | 3.89 | 4.93 | 6.02 | 2.1 | 3.3 | 5.6 |
| C | 7.30 | 15.20 | 24.40 | 1.6 | 3.2 | 4.9 |

"MFI" refers to the melt flow index which is determined in accordance with ASTM D-1238-70, 230° C., 2.16 kg and "YI" refers to the yellowness index determined in accordance with ASTM D-1925-70 on sample pellets.

EXAMPLE 16

Synthesis of Tris-1,1,1-(diphenylphosphinomethyl) ethane

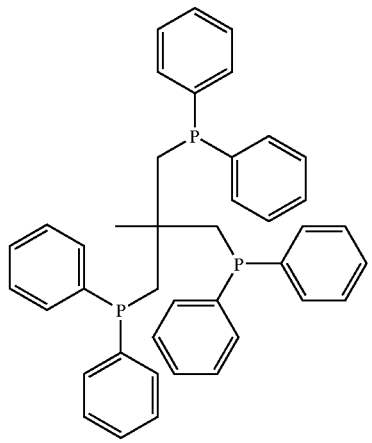

Under inert conditions, 4.90 g diphenylphosphine are added to a mixture of 15 mL abs. dimethylsulfoxide and 13.8 g potassium carbonate. After 15 min of stirring, a solution of 1.66 g KOH in 1.3 mL water is added. To the red suspension a solution of 1.44 g tris-1,1,1-chloromethylethane in 6 mL dimethylsulfoxide is added dropwise and then stirred 12 h at 90° C. 160 mL water are added and after stirring two hours the product is extracted with 60 mL diisopropylether. The organic phase is dried over sodium sulfate and the solvent is stripped off. The crude product is crystallized by addition of ethanol/hexane. Yield: 61%, mp. 96–97° C., $\delta(^{31}P)=-25.5$ ppm.

EXAMPLE 17

Synthesis of Tris-1,1,1-(diphenylphosphinomethyl) propane

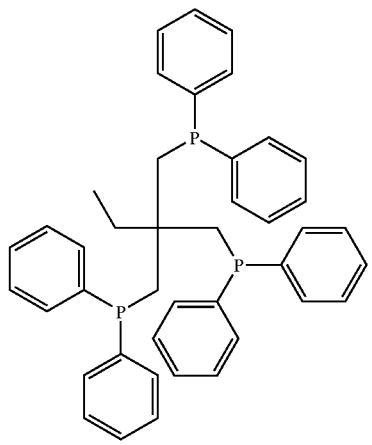

Under inert conditions, 4.84 g diphenylphosphine are added to a mixture of 15 mL abs. dimethylsulfoxide and 15 g potassium carbonate. After 15 min of stirring, a solution of 1.85 g KOH in 2 mL water is added. To the red suspension a solution of 1.64 g tris-1,1,1-chloromethylpropane in 6 mL dimethylsulfoxide is added dropwise and then stirred 12 h at 50° C. 150 mL water are added and after stirring two hours the aqueous phase is decanted and the product is dissolved in 40 mL chloroform. The organic phase is dried over sodium sulfate and the solvent is stripped off. The crude product is recrystallized from ethanol/acetonitrile.

Yield: 43%, mp. 106–108° C., $\delta(^{31}P)=-26.4$ ppm.

EXAMPLE 18

Synthesis of Bis-2,2-(diphenylphosphinomethyl) propane

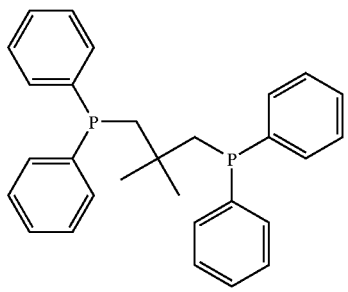

Under nitrogen, 6.0 g diphenylphosphine are added to a mixture of 30 mL abs. dimethylsulfoxide and 3.6 g potassium tert.-butanolate. To the red suspension a solution of 2.1 g bis-2,2-chloromethylpropane in 30 mL dimethylsulfoxide is added dropwise. The reaction mixture is stirred 1 h at 120° C. After cooling to 80° C. 100 mL water are added and the product is extracted after two hours stirring with 60 mL chloroform. The solution is dried over sodium sulfate and the solvent stripped off. The crude product is crystallized by addition of ethanol/hexane.

Yield: 72%, mp. 88–89° C.

EXAMPLE 19

Synthesis of Tetra-cyclohexyl-cyclotetraphosphine

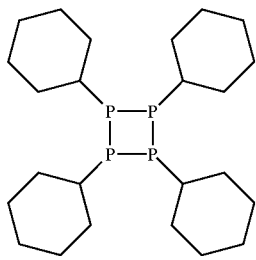

Under nitrogen, 11.6 g cyclohexylphosphine are added to 15.4 g cyclohexyl-dichlorophosphine and 40 mL toluene and refluxed for 3 hours. After cooling the colorless product is filtered off and recrystallized from toluene.

Yield: 75%, mp.: 226–229° C., $\delta(^{31}P)=-67.1$ ppm

EXAMPLE 20

Synthesis of Penta-biphenylyl-cyclopentaphosphine

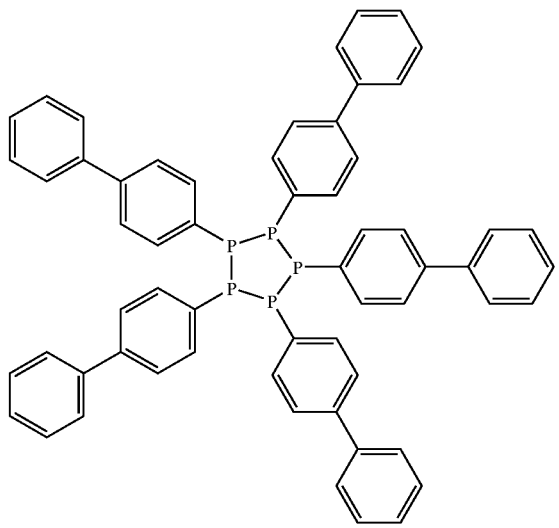

Under nitrogen 25.5 g biphenyl-dichlorophosphine (isomeric mixture from the Friedel-Crafts reaction of biphenyl and phosphorus trichloride, >90% 4-biphenyl-dichlorophosphine) are dissolved in 100 mL tetrahydrofurane (THF) and 2.4 g magnesium turnings are added with ice cooling. After 30 min the ice bath is removed and the reactants stirred 20 h at ambient temperature. 60 mL acetone are added and the yellowish precipitate is filtered off. The crude product is agitated with 100 mL 0.5 molar hydrochloric acid to remove magnesium residuals, filtered, washed with water and acetone and dried.

Yield 50%, mp.: 227–229° C., $\delta(^{31}P)$=14.1 ppm and 17.5 ppm

EXAMPLE 21

Synthesis of Penta-(2,4,4-trimethyl-pentyl)-cyclopentaphosphine (TMP-P)$_5$

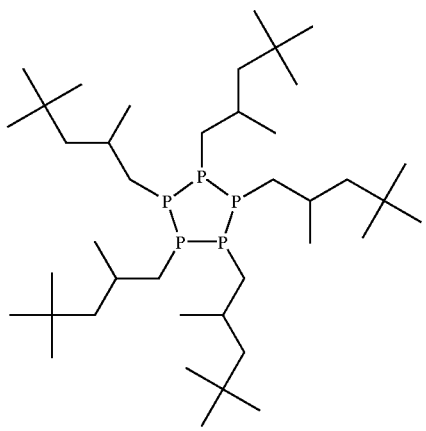

Under nitrogen and ice cooling, 32.0 g bromine are added to a mixture of 74.1 g tributylamine and 58.5 g of a 50 wt % solution of 2,4,4-trimethyl-pentylphosphine in toluene. Then the mixture is heated to reflux for a short time. After addition of 50 mL water, the phases are separated and the aqueous layer extracted two times with 10 mL toluene. The combined organic phases are dried over sodium sulfate and the solvent is stripped off in vacuo. The brownish crude product is distilled in a Kugelrohr apparatus at 250° C./0.05 mm Hg.

Yield: 75% colorless viscous liquid, $\delta(^{31}P)$=−5 to +30 ppm, complex multiplett ((TMP-P)$_5$); −67.5 ppm (2 Peaks, (TMP-P)$_4$ ca. 2%)

COMPARATIVE EXAMPLE D

As a comparative substance, representing the state of the art, the commercially available Sandostab P-EPQ of Clariant International Ltd. (former Sandoz Ltd.), Switzerland, has been chosen.

Application of substances of the Examples 16–18 as processing stabilizers in a mixture consisting of

| | |
|---|---|
| 100 parts | 3rd generation polypropylene homopolymer |
| 0.05 part | Tetrakis(methylen-3(3',5'-di-tert-buytl-4'-hydroxyphenyl)propionate)methane |
| 0.01 part | Calcium stearate and |
| 0.04 resp. 0.07 part | of an inventive stabilizer or of a comparative substance (Sandostab P-EPQ), | are dry blended and homogenized by extrusion in a single screw extruder at 210° C. The resulting pellets are extruded five times in a Göttfert single screw extruder (d-20 mm, l/d=20, 50 min$^{-1}$, compression 1:3) at 270° C. and the melt flow index (MFI ASTM D-1238-70), as well as the Yellowness Index (ASTM D-1925-70) are determined after the first, third and fifth extrusion passage. The data obtained are summarized in the following table.

| Substance of Example No. | Parts Stabilizer | Melt Flow Index [g/10 min] extrusion passage | | | Yellowness Index extrusion passage | | |
|---|---|---|---|---|---|---|---|
| | | 1. | 3. | 5. | 1. | 2. | 5. |
| Sandostab P-EPQ | 0.04 | 2.45 | 4.13 | 6.31 | 0.3 | 1.1 | 2.1 |
| | 0.07 | 1.91 | 2.57 | 3.75 | −0.1 | 0.8 | 1.5 |
| 16 | 0.04 | 1.73 | 2.63 | 4.02 | −0.6 | 0.5 | 2.0 |
| | 0.07 | 1.68 | 2.26 | 2.90 | −0.6 | −0.1 | 0.6 |
| 17 | 0.04 | 1.76 | 2.38 | 3.47 | −0.3 | 0.1 | 0.4 |
| | 0.07 | 1.70 | 2.28 | 2.89 | −0.3 | 0.3 | 1.0 |
| 18 | 0.04 | 1.51 | 2.44 | 3.27 | −0.4 | 0.0 | 0.9 |
| | 0.07 | 1.56 | 2.10 | 3.17 | 0.0 | 0.5 | 1.5 |

COMPARATIVE EXAMPLE E

Application of substances of the Examples 19–21 as processing stabilizers in a mixture consisting of

| | |
|---|---|
| 100 part | 3rd generation polypropylene homopolymer |
| 0.05 part | Tetrakis(methylen-3(3',5'-di-tert-butyl-4'-hydroxyphenyl)propionate)methane |
| 0.01 part | Calcium stearate and |
| 0.04 resp. 0.07 part | of an inventive stabilizer or of a comparative substance (Sandostab P-EPQ), | are dry blended and homogenized by extrusion in a single screw extruder at 210° C. The resulting pellets are extruded five times in a Göttfert single screw extruder (d=20 mm, l/d=20, 50 min$^{-1}$, compression 1:3) at 270° C. and the melt flow index (MFI ASTM D-1238-70), as well as the Yellowness Index (ASTM D-1925-70) are determined after the first, third and fifth extrusion passage. The data obtained are summarized in the following table.

| Substance of Example No. | Parts Stabilizer | Melt Flow Index [g/10 min] extrusion passage | | | Yellowness Index extrusion passage | | |
|---|---|---|---|---|---|---|---|
| | | 1. | 3. | 5. | 1. | 3. | 5. |
| Sandostab P-EPQ | 0.04 | 2.45 | 4.13 | 6.31 | 0.3 | 1.1 | 2.1 |
| | 0.07 | 1.91 | 2.57 | 3.75 | −0.1 | 0.8 | 1.5 |
| 19 | 0.04 | 2.06 | 2.98 | 4.08 | −0.1 | 0.4 | 0.8 |
| | 0.07 | 2.06 | 2.94 | 3.92 | −0.6 | −0.3 | 0.4 |
| 20 | 0.04 | 2.01 | 2.85 | 3.65 | 1.1 | 1.5 | 1.9 |
| | 0.07 | 1.94 | 2.87 | 3.65 | 0.9 | 0.8 | 0.9 |
| 21 | 0.04 | 2.46 | 3.18 | 3.81 | 1.3 | 1.5 | 1.9 |

EXAMPLE 22

Synthesis of Tetra-cyclohexyl-cyclotetraphosphine

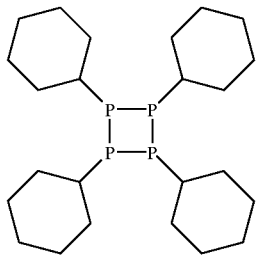

Under nitrogen and ice cooling, 6.4 g bromine are added to a mixture of 5.5 g anhydrous potassium carbonate and 4.65 g cyclohexylphosphine in 15 mL toluene. Then the mixture is heated to reflux for a short time. After addition of 10 mL water the solid is filtered off and washed two times with 5 mL methanol and dried in vacuo.

Yield: 43% colorless crystals, mp. 227–230° C., $\delta(^{31}P)=-67.1$ ppm.

EXAMPLE 23

Synthesis of Tetra-cyclohexyl-biphosphine

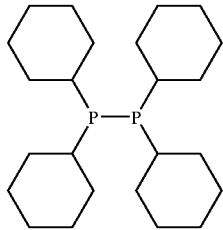

Under nitrogen and ice cooling, 3.2 g bromine are added to 7.9 g di-cyclohexylphosphine in 10 mL triethylamine and 10 mL toluene. Then the mixture is heated to reflux for a 15 min., 10 mL water are added, and the solid is filtered off and washed two times with 5 mL methanol and dried in vacuo.

Yield: 36% colorless crystals, mp.: 168–170° C.

What is claimed is:

1. A polyolefinic composition comprising a) a compound of formula II

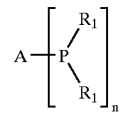
(II)

wherein each $R_1$ independently is selected from linear or branched $C_{6-30}$aryl, unsubstituted or substituted by 1 to 5 groups $R_3$ selected from $C_{1-12}$alkyl, $C_{1-18}$alkoxy, $C_{6-8}$cycloalkyl, phenyl or phenoxy, —$OR_4$, —$NR_4R_5$, —$COR4$ and —$COOR_4$, $R_4$ and $R_5$ independently are selected from hydrogen, $c_{1-30}$alkyl (linear or branched), $C_{5-12}$cycloalkyl, $C_{6-24}$aryl, $C_{7-30}$alkaryl or $C_{7-30}$aralkyl;

A is a $C_{1-30}$alkylene (linear or branched), $C_{2-30}$alkylidene;

n is 2 to 5; and the compounds of formulae II hereinafter being called component a; and a polyolefin which has been produced in the presence of a Generation II, III, IV, or V catalyst which has not been removed (hereinafter called component b).

2. A composition according to claim 1 the compound of formula II are of formula IIa $$A'—(P(R_1')_2)_{n'}$$ (IIa)

in which each $R_1'$ independently is selected from a $C_{6-18}$aryl,

A' is selected from $C_{1-12}$alkylene, $C_{1-12}$alkylidene; and n' is 2 to 4.

3. A composition according to claim 1 wherein component a) is present in an amount of 0.02–1% based on the weight of the polymer present in the composition.

4. A composition according to claim 1 further comprising a polymeric additive composition selected from the group consisting of antioxidants, acid scavengers, hydrotalcite or alkoxylated amities; U.V. stabilizer, U.V. absorbers, U.V. quenchers, antistatic agents, flameproofing agents, lubricants, plasticisers, nucleating agents, metal deactivators, biocides, impact modifiers, fillers, pigments and fungicides.

5. A composition according to claim 1, wherein component b is polypropylene.

6. A composition according to claim 1, wherein component b is polyethylene.

7. A compound of the formula IIIa $$>(P—R_1)_5$$ (IIIa)

wherein:

$R_1$ is -(4 phenyl)phenyl or -(2,4,4-trimethyl)-pentyl.

8. A process for preparing compounds of formula II and compounds of formula III

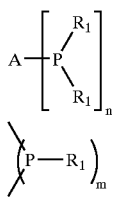

(II)

wherein each $R_1$ independently is linear or branched $C_{1-30}$alkyl, $C_{6-12}$cycloalkyl, $C_{2-24}$alkenyl, $C_{2-18}$alkoxyalkyl, $C_{2-19}$alkanoylmethylene, $C_{7-30}$ alkaryl, $C_{7-30}$aralkyl, or $C_{4-24}$heteroaryl where any on of the above substituents of $R_1$ are unsubstituted or are substituted by 1 to 3 groups selected from the group consisting of $C_{1-12}$alkyl, —$OR_4$, —$NR_4R_5$, —$COR_4$ and —$COOR_4$; and $C_{6-30}$aryl, unsubstituted or substituted by 1 to 5 groups $R_3$ selected from the group consisting of $C_{1-2}$alkyl, $C_{1-8}$alkoxy, $C_{5-6}$cycloalkyl, phenyl or phenoxy —$OR_4$, —$NR_4R_5$, —$COR_4$ and —$COOR_4$;

$R_4$ and $R_5$ independently are selected from the group consisting of hydrogen, $C_{1-30}$alkyl (linear or branched), $C_{5-12}$cycloalkyl, $C_{6-24}$aryl, $C_{7-30}$alkaryl, and $C_{7-30}$aralkyl;

m is 3 to 12; and n is 2 to 5 comprising the step of reacting either a secondary phosphine of the formula $R_1R_1PH$ or a primary phosphine of the formula $R_1PH_2$ with a halogen, in the presence of an acid acceptor and optionally in the presence of an inert solvent.

9. A polyolefinic composition comprising b) a compound of formula II

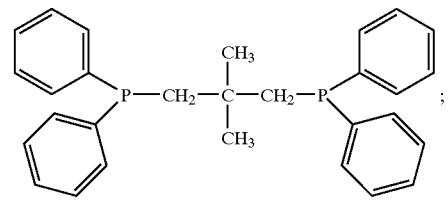

(II)

; and a polyolefin which has been produced in the presence of a Generation II, III, IV, or V catalyst which has not been removed.

10. A polyolefinic composition comprising c) a compound of formula II

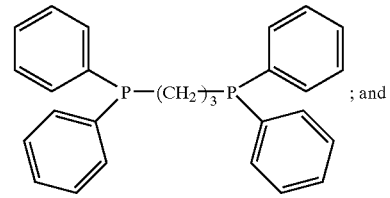

; and a polyolefin which has been produced in the presence of a Generation II, III, IV, or V catalyst which has not been removed.

11. The process according to claim 8, wherein m is 4 to 6.

12. The process according to claim 8, wherein the halogen is chlorine or bromine.

13. The process according to claim 8, wherein acid acceptor is an oxide, hydroxide, carbonate of an alkali earth metal, carbonate of an alkaline earth metal or an amine.

14. The process according to claim 13, wherein the amine is tertiary amine.

* * * * *